(12) United States Patent
Gambetta et al.

(10) Patent No.: US 11,194,554 B2
(45) Date of Patent: Dec. 7, 2021

(54) EFFICIENT QUANTUM ADAPTIVE EXECUTION METHOD FOR QUANTUM CIRCUITS

(71) Applicant: International Business Machines Corporation, Armonk, NY (US)

(72) Inventors: Jay Michael Gambetta, Yorktown Heights, NY (US); Ismael Faro Sertage, Chappaqua, NY (US); Francisco Jose Martin Fernandez, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/860,644

(22) Filed: Apr. 28, 2020

(65) Prior Publication Data

US 2021/0334079 A1 Oct. 28, 2021

(51) Int. Cl.
*G06F 8/41* (2018.01)
*G06N 10/00* (2019.01)
*G06F 8/36* (2018.01)

(52) U.S. Cl.
CPC ............ *G06F 8/41* (2013.01); *G06F 8/36* (2013.01); *G06N 10/00* (2019.01)

(58) Field of Classification Search
None
See application file for complete search history.

(56) References Cited

U.S. PATENT DOCUMENTS 10,223,141 B2   3/2019   Mars et al.
10,430,162 B2   10/2019  Roetteler et al.
10,592,216 B1   3/2020   Richardson et al.
(Continued)

FOREIGN PATENT DOCUMENTS

WO   2019108512 A1   6/2019

OTHER PUBLICATIONS

Gokhale, "Partial Compilation of Variational Algorithms for Noisy Intermediate-Scale Quantum Machines", 2019, ACM (Year: 2019).*
(Continued)

*Primary Examiner* — Hossain M Morshed
(74) *Attorney, Agent, or Firm* — Amin, Turocy & Watson, LLP

(57) ABSTRACT

Systems and methods that can facilitate a quantum adaptive execution method based on previous quantum circuits and its intermediate results. This can generate an optimized adaptive compilation methodology for a specific backend and the previous quantum circuits dependents and thus redirect by the job dispatcher to the right quantum backend. Some of the quantum circuits can be dependent on other quantum circuits based on the intermediate results produced by the previous circuits. Hence, it is valuable that a system can manage the optimization of circuits based on its dependencies and by the results generated by the previous quantum circuits. In this way, the system can get an optimal result for a quantum circuit and inject it to the compiler unit to generate an adaptive compilation result. The resulted post-processing unit is the one in charge to apply this logic and manage the input/output of data to push it in the compiler units and the job dispatcher.

25 Claims, 11 Drawing Sheets

(56) References Cited

U.S. PATENT DOCUMENTS

| | | | |
|---|---|---|---|
| 2003/0036809 A1* | 2/2003 | Landman | G06F 9/5027 |
| | | | 700/4 |
| 2013/0311980 A1* | 11/2013 | Cabillic | G06F 9/45516 |
| | | | 717/148 |
| 2017/0255629 A1* | 9/2017 | Thom | G06N 10/00 |
| 2018/0365585 A1 | 12/2018 | Smith et al. | |
| 2019/0042971 A1 | 2/2019 | Zou | |
| 2019/0026645 A1 | 6/2019 | Correll et al. | |
| 2019/0258952 A1 | 8/2019 | Denchev | |
| 2019/0340532 A1 | 11/2019 | Ducore et al. | |
| 2019/0378047 A1 | 12/2019 | Pistoia et al. | |
| 2020/0401427 A1* | 12/2020 | Gambetta | G06F 9/455 |
| 2021/0012233 A1* | 1/2021 | Gambetta | G06N 10/00 |

OTHER PUBLICATIONS

Steiger. "Software and Algorithms for Quantum Computing" DOI: 10.3929/ethz-b-000322770 (2018).

International Search report and written opinion received for PCT application No. PCT/EP2021/060018 dated Jul. 12, 2021, 12 pages.

Gokhale et al., "Partial Compilation of Variational Algorithms for Noisy Intermediate-Scale Quantum Machines", DOI:10.1145/3352460.3358313, Sep. 17, 2019, pp. 266-278.

* cited by examiner

EFFICIENT QUANTUM ADAPTIVE EXECUTION METHOD FOR QUANTUM CIRCUITS

TECHNICAL FIELD

The subject disclosure relates to a quantum adaptive execution method based on quantum circuits dependencies and intermediate results generated by previous quantum circuits. An optimized adaptive compilation methodology is employed for a specific backend quantum circuit and previous dependent quantum circuits and thus redirect the circuit by a job dispatcher to a quantum backend that runs the quantum circuit.

BACKGROUND

Quantum programming is a process of assembling a sequence of instructions called quantum programs. Quantum programs are also known as jobs that are capable of running on a quantum computer. A quantum program can have a collection of quantum circuits. A quantum circuit in a job can have dependencies and the result of previous quantum circuits can be used to run a next quantum circuit. When a quantum circuit is executed, a result is produced by the quantum computer; some of these quantum circuit results are dependent on intermediate results produced by previous quantum circuits. Many conventional quantum circuit optimization techniques focus on enhancing quantum circuits to provide an optimal result whereby a user can only run one quantum program in one quantum computer. Conventional techniques of sending all jobs (a list of circuits) in a serial fashion and executing the respective jobs in order can lead to propagation of error or noise (e.g., produced by an environment cables, other hardware . . . ) through to a subsequent circuit to be executed thus leading to undesirable quantum program execution.

SUMMARY

The following presents a summary to provide a basic understanding of one or more embodiments of the invention. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products facilitate the generation of quantum adaptive execution method based on previous quantum circuits and its intermediate results.

In accordance with an embodiment, a system, comprises a processor, operatively coupled to a memory, that executes the following computer executable components: a receiving component that receives a quantum program for performing a quantum task, wherein the quantum program includes a first program and a second program; an adaptive compiling component that compiles the first program; an executing component that executes the compiled first program; a second receiving component that receives an output based on executing the compiled first program; a second adaptive compiling component that compiles the second program based on the received output from executing the first program; and a second executing component that executes the compiled second program.

In an optional aspect, the determining component employs one or more circuit outputs that are applied to one or more circuit inputs.

In an optional aspect, the first program is defined based on the previously generated one or more outputs from the first program.

In yet another optional aspect, the second program is defined based on the previously received one or more outputs from the second program.

In accordance with an embodiment, a computer implemented method, comprises: using a processor, operatively coupled to a memory, to execute computer executable components to perform the following acts: using the processor to receive a quantum program for performing a quantum task, wherein the quantum program includes a first program and a second program. An adaptive compiling component compiles the first program and the executing component executes the compiled first program. The second receiving component receives an output based on executing the compiled first program. The second adaptive compiling component compiles the second program based on the received output from executing the first program. Then the second executing component executes the compiled second program.

In an optional aspect, the computer implemented method further comprises determining, by the system, one or more circuit outputs that are applied to one or more circuit inputs.

In another optional aspect, the computer implemented method further comprises employing, by the system, the first program which is defined based on the previously generated one or more outputs from the first program.

In yet another optional aspect, the computer implemented method further comprises employing, by the system, the second program which is defined based on the previously received one or more outputs from the second program.

In accordance with an embodiment, a computer implemented method, comprises: using a processor, operatively coupled to a memory, to execute computer executable components to perform the following acts: using the processor to determine one or more circuit outputs that are applied to one or more circuit inputs. The first program is defined based on the previously generated one or more outputs from the first program. The second program is defined based on the previously received one or more outputs from the second program. The receiving component recompiles the compiled first program into a first recompiled program adapted to execute on a first quantum hardware device. Receiving a first output is based on executing the recompiled first program. Then, the compiled first program is recompiled into a second recompiled program which is adapted to execute on a second quantum hardware device. The second output is received based on executing the recompiled second program. The second program is compiled based on selecting either the received first or the received second output.

DETAILED DESCRIPTION

Figure 1:
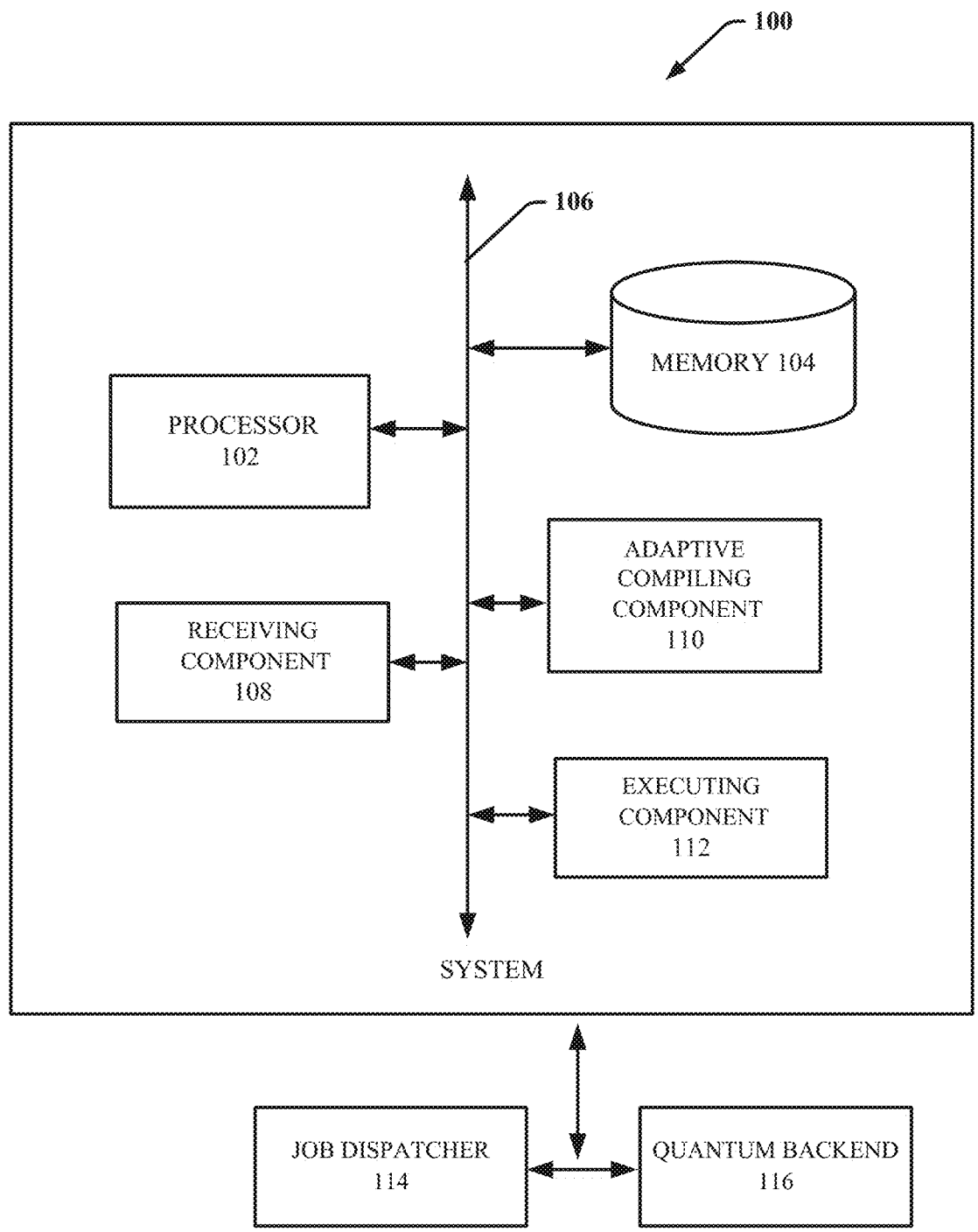
FIG. 1 illustrates a block diagram of an example system implementation that facilitates quantum adaptive execution of quantum circuits based on previous quantum circuits and intermediate results to generate an adaptive compilation.

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like reference numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

The subject disclosure relates generally to systems and methods that use a quantum adaptive execution method for quantum circuits based on previous quantum circuits and its intermediate outputs. This can generate an adaptive compilation result which is optimized for a specific backend and previous quantum circuit dependents and thus redirect by the job dispatcher to the right quantum backend. Embodiments disclosed herein can improve a next quantum circuit with results of previous circuits in a combinational manner such that number of errors generated can be reduced, system efficiency improved and an enhanced conditional logic in a quantum computer achieved. Embodiments can employ a first circuit or program, analyze the program and compile it. Then, the next sequence or second program is compiled based on previous sequence output and its internal code. There are several parameters on a quantum computer which may change based on quantum sequence that is run. Results obtained through such compilation can be used to modify a quantum product wherein gates/parameters can be changed for recompilation such that an optimal result is obtained with reduced error rate. Thus, embodiments use available quantum computer backends to distribute a quantum program across many possible backends and eliminate the restraints associated with one quantum program running in one quantum computer.

In today's digital world, data plays a prime factor in many applications. Action(s) taken can often leave digital footprints through satellite images, bio-medical fields, smartphones, social media, and other applications. Rapidly growing technology has led to exponential increase in machine-generated data. Big Data represents a new era in data exploration and utilization such that it contains data that is high in volume, variety and velocity. Modern advances in software engineering have led to deploying software as services (e.g., SaaS), which provides a significant advantage for organizations to focus on core businesses instead of expanding resources on computer infrastructure and maintenance. For example, 'big-data' clustering software as a service that employs a set of data instances as input, can perform computations for data clustering and return partitioned data to a client as an output. Big data can be used in many scenarios for data mining such as for example tracking generated content in social media, analyzing web page images from the web and census data, obtaining required data from Internet of Things (IoT) sensors, and activity tracking from smartphones and network traffic data for cyber-security. As big data becomes ubiquitous in data analytics, demand for data sampling and data dimension features rapidly grow. Thus, as an essentially primitive, quantum computing is receiving ever increasing attention.

Quantum computing is generally use of quantum-mechanical phenomena to perform computing and information processing functions. Quantum computing can be viewed in contrast to classical computing, which generally operates on binary values with transistors. That is, while classical computers can operate on bit values that are either 0 or 1, quantum computers operate on quantum bits that comprise superpositions of both 0 and 1, can entangle multiple quantum bits, and use interference. Superconducting qubits offer a promising path towards constructing fully-operational quantum computers as it can exhibit quantum-mechanical behavior (allowing to be used for quantum information processing) at a macroscopic level (e.g., designed and fabricated by existing integrated circuit technologies). A quantum computation uses a qubit as its essential unit instead of a classical computing bit. The qubit (e.g., quantum binary digit) is the quantum-mechanical analogue of the classical bit. Whereas classical bits can employ on only one of two basis states (e.g., 0 or 1), qubits can employ on superpositions of those basis states (e.g., $\alpha|0>+\beta|1>$, where $\alpha$ and $\beta$ are complex scalars such that $|\alpha|^2+|\beta|^2=1$), allowing a number of qubits to theoretically hold exponentially more information than a same number of classical bits. Thus, quantum computers (e.g., computers that employ qubits instead of solely classical bits) can, in theory, quickly solve problems that can be extremely difficult for classical computers. The bits of a classical computer are simply binary digits, with a value of either 0 or 1. Almost any device with two distinct states can serve to represent a classical bit: a switch, a valve, a magnet, a coin, etc. Qubits, partaking of the quantum mystique, can occupy a superposition of 0 and 1 states. It's not that the qubit can have an intermediate value, such as 0.63; when the state of the qubit is measured, the result is either 0 or 1. But in the course of a computation, a qubit can act as if it were a mixture of states—for example: 63 percent 0 and 37 percent 1.

Quantum computing is generally the use of quantum-mechanical phenomena to perform computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1, which can entangle multiple quantum bits, and use interference. Quantum computing has the potential to solve problems that, due to their computational complexity, cannot be solved, either for many practical purposes, on a classical computer. However, quantum computing requires very specialized skills to, for example, prepare a quantum state of a probability distribution to perform amplitude estimation. Quantum programming is the process of assembling sequences of instructions, called quantum programs, that are capable of running on a quantum computer.

A quantum program can have a collection of quantum circuits. When a quantum circuit is executed, a result is produced by the quantum computer. Some of these circuits can be dependent on other circuits, based on the intermediate results produced by the previous circuits. The characterization of the problem is when quantum circuits have dependencies during its execution. Hence, these embodiments propose system(s) and method(s) that can manage optimization of a quantum circuit based on dependencies and results generated by previous quantum circuits. This can facilitate mitigating constraints associated with one quantum program running in one quantum computer. Embodiments herein optimize iterative algorithms to run on several quantum computers with various features and noise quality. An advantage of such embodiments can be to adapt a quantum program on a set of quantum computers and split it to run in different quantum backends. This can speed up execution time and thus produce an effective quantum circuit in the quantum backend that runs the quantum circuit.

The subject computer processing systems, methods apparatuses and/or computer program products can be employed to solve new problems that arise through advancements in technology, computer networks, the Internet and the like.

FIG. 1 illustrates a block diagram of an example system 100 that can access data and process that data using variable computing components depicted in accordance with one or more embodiments described herein. The system 100 can facilitate a process of assessing and identifying large amounts of various forms of data, using machine learning, and training a neural network or other type of model. The system 100 can also generate predictive recommendations to an individual level with context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform operations described herein. Repetitive description of like elements employed in one or more embodiments described herein is omitted for sake of brevity.

The system 100 facilitates quantum adaptive execution of quantum circuits based on previous quantum circuits and intermediate results to generate an adaptive compilation optimized for a specific backend and previous quantum circuits dependents and redirect by a job dispatcher 114 to an appropriate quantum backend 116 based on running quantum circuits and the returning results.

The system 100 can facilitate a process of assessing and identifying a large amount of various forms of data. The system 100 can also generate predictive recommendations to an individual level resulting in a context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System 100 can optionally include a server device, one or more networks and one or more devices (not shown). The system 100 can also include or otherwise be associated with at least one processor 102, operatively coupled to memory 104, that executes computer executable components. The system 100 can further include a system bus 106 that can operatively couple various components including, but not limited to, a receiving component 108 that receives a quantum program for performing a quantum task, wherein the quantum program includes a first program. An adaptive compiling component 110 compiles the first program and an executing component 112 executes the compiled first program. Advantages of such system 100 include identifying errors, enhance execution methods to improve efficiency, and change parameters to provide optimal results by making modifications to original code.

In an implementation, the receiving component 108 receives a quantum program for performing a quantum task, wherein the quantum program includes a first program. The first program is defined based on previously generated one or more outputs from the first program. A second program is defined based on previously received one or more outputs from the second program. The receiving component recompiles the compiled first program into a first recompiled program adapted to execute on a first quantum hardware device. The adaptive compiling component 110 compiles the first program, and the executing component 112 executes the compiled first program. An advantage of such embodiment is that one or more circuit outputs are applied to one or more circuit inputs to provide optimal results based on previous outputs. The first program is defined based on the previously generated one or more outputs from the first program. The receiving component 108 recompiles the compiled first program into a first recompiled program adapted to execute on a first quantum hardware device.

A quantum circuit can be generated by using a circuit composer. This allows to visually learn how to create a quantum circuit and depicts a story of what happens to qubits during a program run. To manipulate an input state of a circuit, the basic operations of quantum computing need to be applied. Through the use of gates, quantum logic can be put together and thus produce a quantum circuit. An individual backend system is used to compile this circuit. As stated in the paragraph above, these embodiments propose an efficient quantum adaptive execution method of a quantum circuit. A quantum circuit is an ordered list of quantum gates that runs in a quantum computer (backend). The quantum circuit in a job can have dependencies and the result of the previous quantum circuits are needed to run the next quantum circuit. Thus, these embodiments focus to optimize an iterative algorithm for several quantum computers with different features and noise quality. When a quantum program is received, the first program is compiled and executed. The output of the first compiled program is received and the second program is compiled and executed. Through this technique, execution time is improved (e.g., faster than through conventional techniques) by splitting the program to run in different backends and thus produce an effective quantum circuit in a backend.

System 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the systems 100 and/or any other suitable device that can employ information provided by system 100. It is to be appreciated that systems 100, components, models or devices can be equipped with communication components (not shown) that enable communication between the system, components, models, devices, etc. over one or more networks.

The various components of systems 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It may be appreciated that such systems and components can include these components or sub-components specified therein, some of the specified components or sub-components, and/or additional components. Sub-components may also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Figure 2:
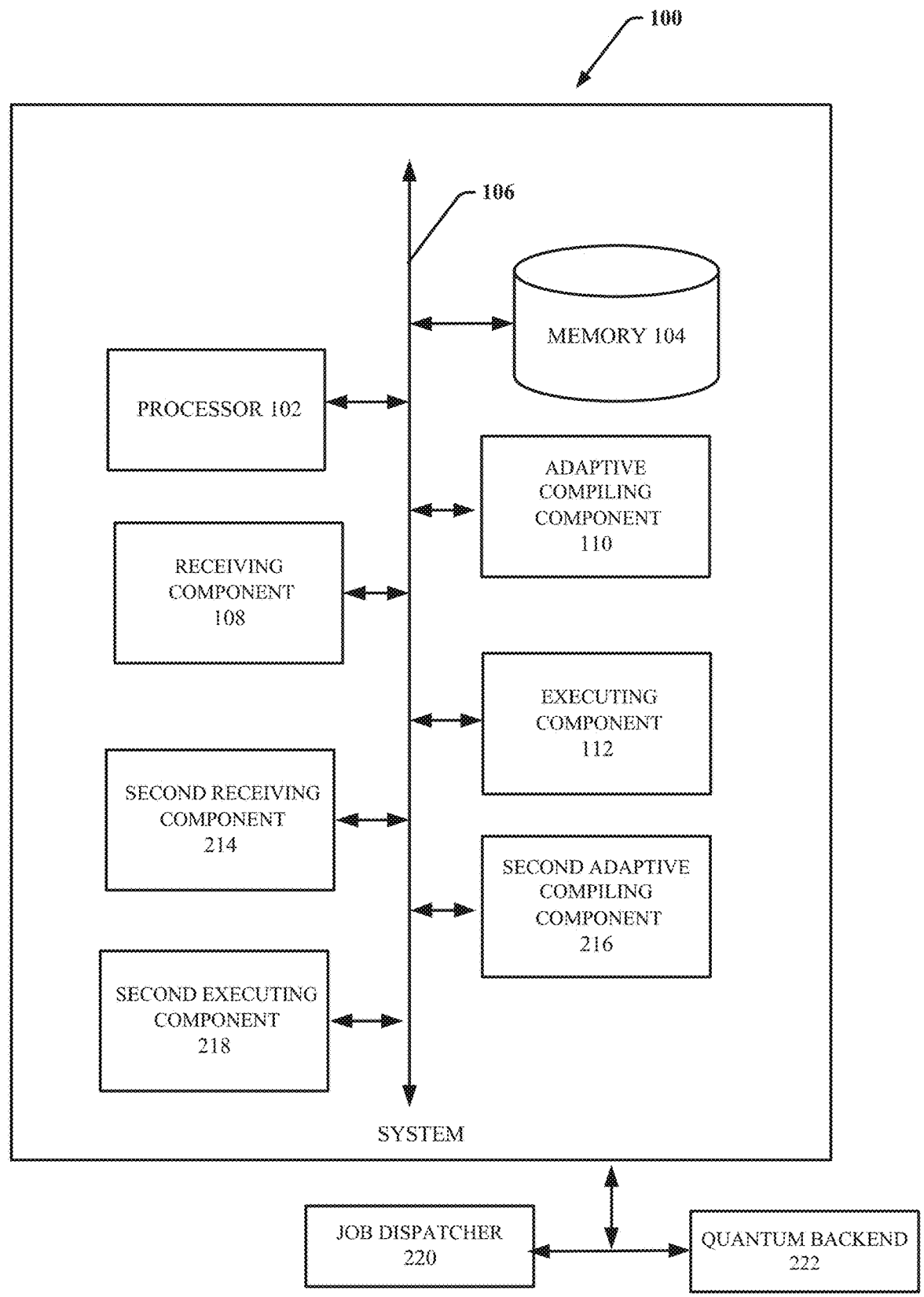
FIG. 2 illustrates a block diagram of an example system implementation that facilitates quantum adaptive execution of quantum circuits based on previous quantum circuits and intermediate results to generate an adaptive compilation.

FIG. 2 illustrates a block diagram of another embodiment of system 100 (FIG. 1) that can access data and process that data using variable computing components depicted in accordance with one or more embodiments described herein. Repetitive description of like elements employed in one or more embodiments described herein is omitted for sake of brevity.

The system 100 can further include a second receiving component 214 that receives an output based on executing the compiled first program. A second adaptive compiling component 216 that compiles the second program based on the received output from executing the first program. A second executing component 218 that executes the compiled second program. In an implementation, the second receiving component 214 receives an output based on executing the compiled first program. The second adaptive compiling component 216 compiles the second program based on the received output from executing the first program and the second executing component 218 executes the compiled second program. The compiled first program is recompiled into a second recompiled program which is adapted to execute on a second quantum hardware device. A second output is received based on executing the recompiled second program. The second program is compiled based on selecting either the received first or the received second output. The previous quantum circuit dependents can be used to redirect by a job dispatcher 220 to a suitable or optimal quantum backend 222. An advantage of such a method can be to utilize the output of the first program and improve the next set of quantum circuits by changing the quantum product.

A quantum program can have a collection of quantum circuits. When a quantum circuit is executed, a result is produced by the quantum computer. Some of these circuits can be dependent on other circuits, based on the intermediate results produced by previous circuits. Hence, it is necessary that the system 200 can manage optimization of circuits based on its dependencies. The system 200 compiles quantum circuits based on previous quantum circuits and intermediate results. An advantage of such system 200 is to enhance quantum results for a quantum circuit and use these results in a compiler unit to generate an adaptive compilation methodology which produces an optimized output for a specific backend. Also, previous quantum circuit dependents can be used to redirect by the job dispatcher 220 to a suitable or optimal quantum backend 222. A resultant post processing-unit applies such logic and manages input/output of data for compiler units and the job dispatcher 220.

Figure 3:
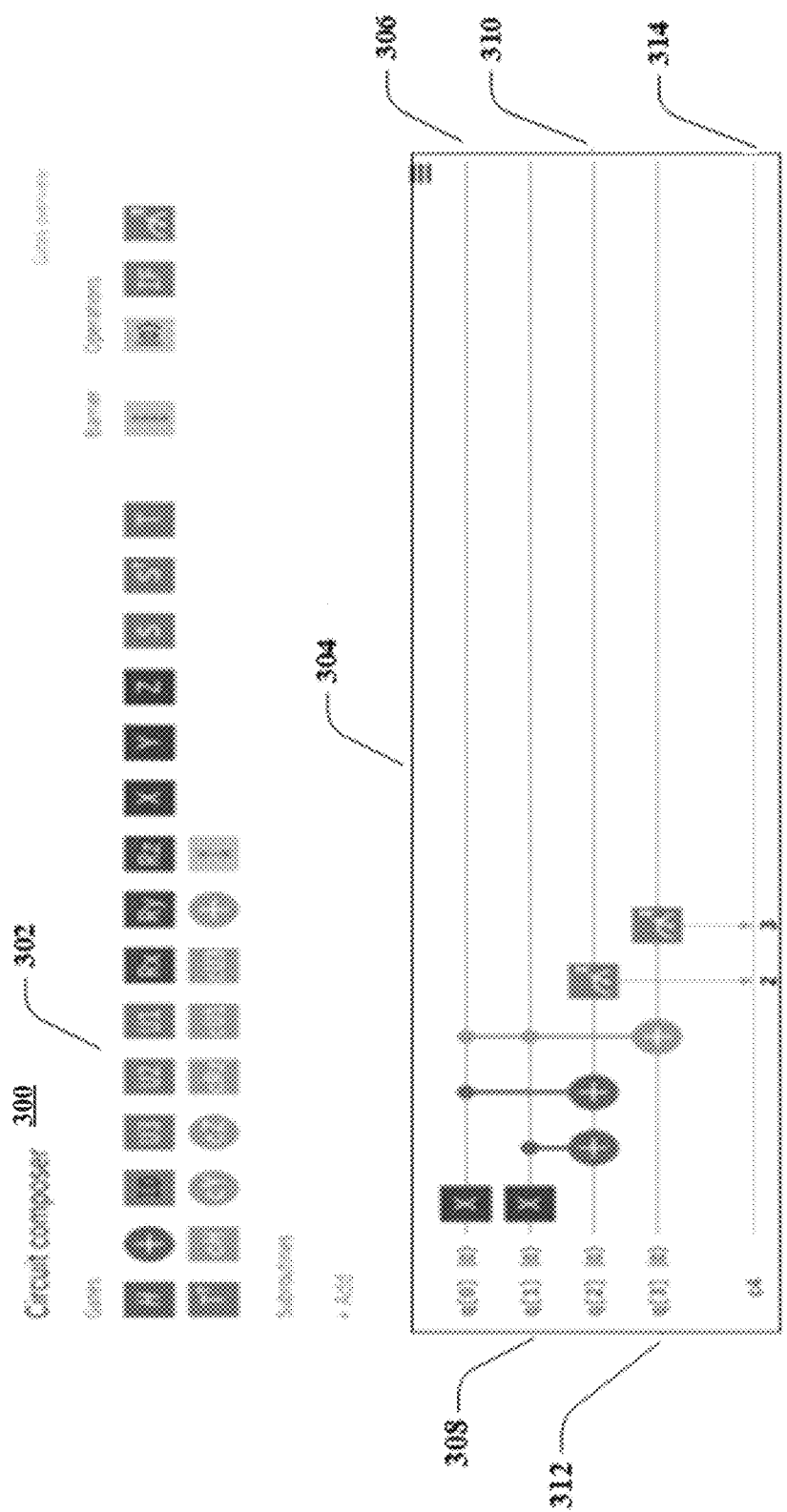
FIG. 3 illustrates an example of a circuit composer that can generate a quantum circuit.

FIG. 3 illustrates an example of a circuit composer 300 that can generate a quantum circuit. As shown in the figure, a quantum circuit is built using the circuit composer 300 that allows to visually learn how to create quantum circuits. The circuit composer 300 contains gates as denoted by block 302. It depicts a story of what happens to qubits during a program, e.g., from left to right. It shows the circuit composer 300, where the tool allows for dragging and dropping quantum operations onto a circuit. A quantum logic gate is a rudimentary quantum circuit operating on a small number of qubits; basic operations of computing are known as gates. To manipulate an input state of a circuit, the basic operations of quantum computing are applied; these are known as quantum gates. Basis gates and topology of a quantum circuit refer to properties of a quantum processor. The basis gates are natively supported by physical hardware. As shown in block 302, there are various gates with a specific purpose of a gate in a quantum circuit. Through use of these gates, quantum logic can be put together and result in a quantum circuit as denoted by block 304. In this circuit, four qubits have been set up and numbered from 0 to 3. A measure operation is then immediately applied to the qubits, which extracts an output of 0 or 1. A gate is placed in the circuit such that block 306 and 308 labeled as q[0] and q[1] have Pauli X gate. Block 310 shows the CX gate toggle from q[0] to q[1] and q[1] to q[2]. Similarly, CX gate is added at block 312 to toggle from q[0] to q[3]. In order to read out results of the computation, the qubits are measured as denoted by block 314 to both q[2] and q[3]. An individual backend system is used to compile this circuit. It may take some of the gates such as q[3] gate to unpack the circuit such that the circuit fits in the hardware.

These embodiments propose a method and a system that provides an efficient quantum adaptive execution method of a program for quantum circuits. In this work-flow, to execute one quantum circuit in a quantum computer (backends), the circuits that are part of one job can be compiled to be optimized and adapted to a specific hardware. The parameters are adjusted to allow a compilation layer to compile circuits in an optimal manner. At this point, one specific circuit in a job can have dependencies of the intermediate results generated from other circuits. In this case, compiler infrastructure in combination with a job dispatcher can reorganize a quantum circuit and include results generated by execution of a previous circuit. A second optimization is at execution time, wherein a compiler unit can wait for a specific result that is generated by an execution of a previous circuit in one or several quantum backends.

Figure 4:
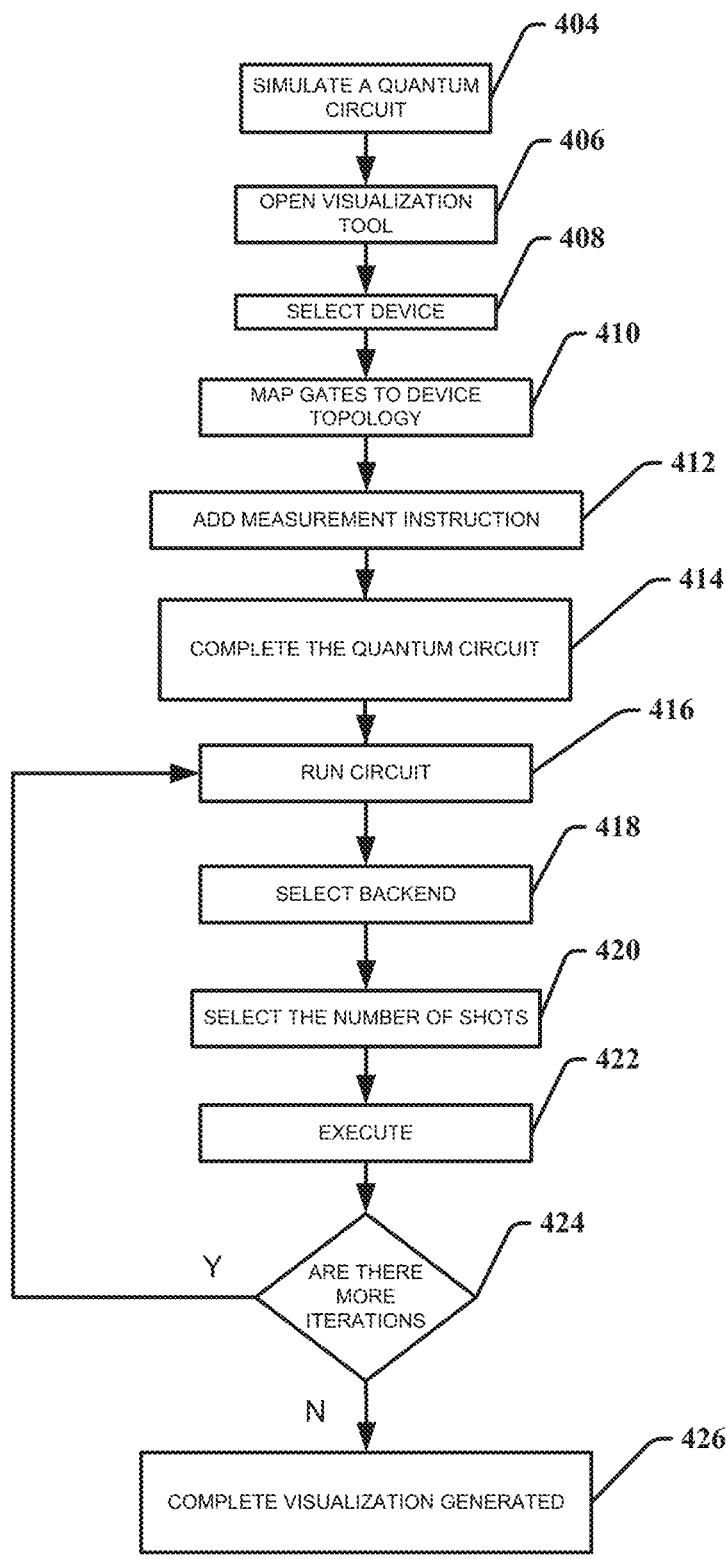
FIG. 4 illustrates an example detailed flow chart of a quantum circuit generator.

FIG. 4 illustrates an example detailed flow chart of a quantum circuit generator, and illustrates a process to use a circuit composer to create a quantum circuit, execute the circuit and interpret results accordingly. The process starts where a quantum circuit is simulated using a graphical user interface as denoted by block 404. Upon opening a visualization tool as denoted by block 406, a device is selected from a predetermined list as denoted by block 408. Once a device is selected, gates are mapped to a topology as denoted by block 410. A set of horizontal lines resembling a ruled piece of paper appears; such lines from left to right are called quantum wires. A quantum wire represents a single qubit. Notation on the left of the wire indicates which qubit the wire represents, and shows that each qubit is initially in |0> state. To retrieve this output from a quantum computer, a qubit must be measured and can be added as denoted by block 412. Measurement has a dramatic effect on qubits, so it is considered an operation itself, and is represented in with a measurement instruction. The measurement result is recorded as a classical bit, drawn as classical wire in the same fashion as a quantum wire. Quantum and classical wires are distinguished by the notation on the left of the wire. Here, the quantum wires are marked as q[0], q[1], etc.; the classical wires are marked as c1, c2, etc. The vertical wire coming out of the measurement instruction depicts information flowing from the quantum wire down to the classical wire. The quantum circuit is completed as denoted by block 414 and execute the circuit as denoted by block 416. A backend is selected as denoted by block 418, which is a term that refers to either a classical simulator of a quantum computer or a real quantum computer, also referred to as a quantum system. A number of shots (e.g., the number of times the quantum circuit is executed) is selected as denoted by block 420. Once the circuit has been executed as denoted by block 422, the system will perform iterations based on the number of shots selected as denoted by block 424. If there are no more iterations then execution is completed at block 426 along with results reports produced. Through this process, a quantum circuit is built and executed as per the chosen gates/parameters.

Figure 5:
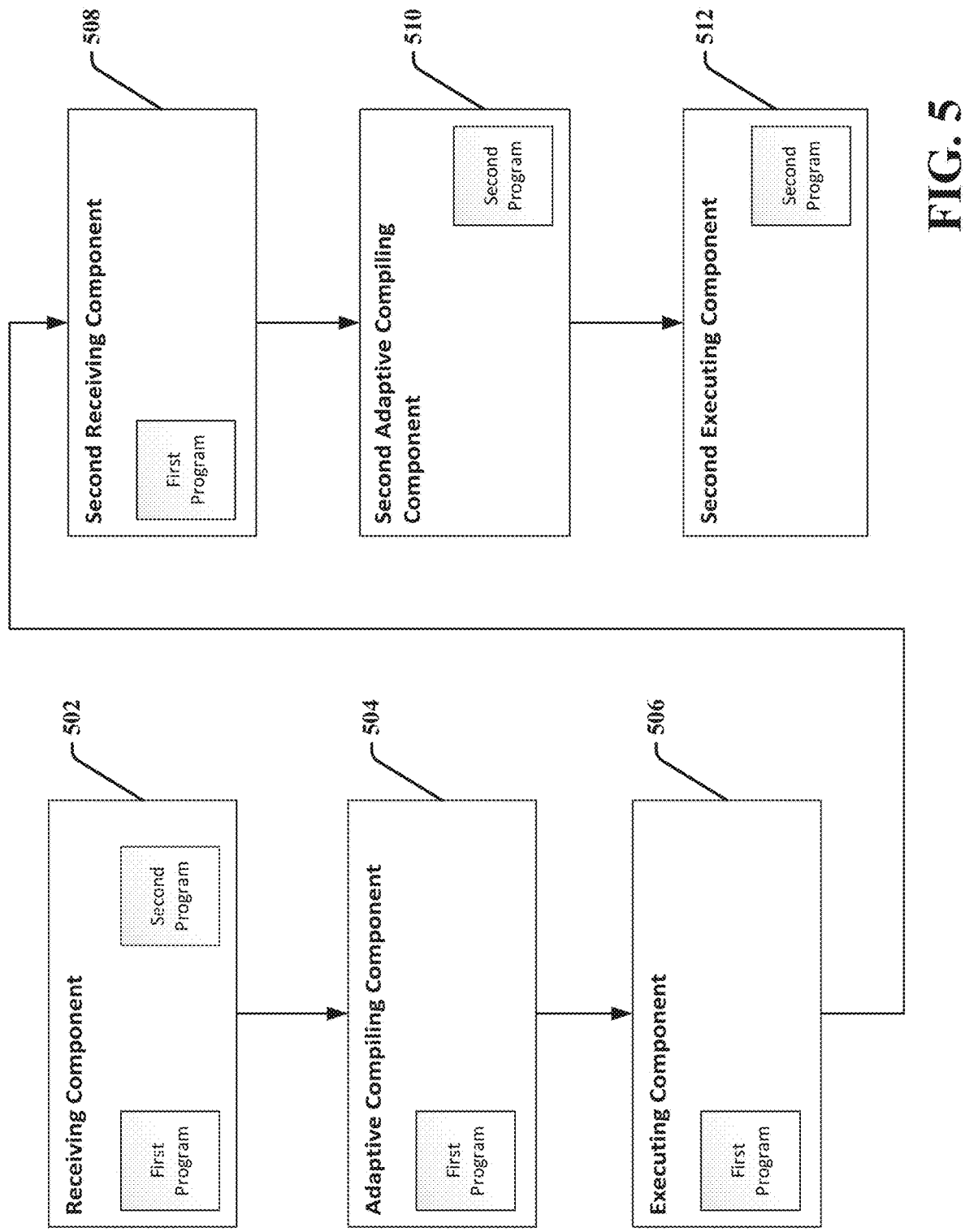
FIG. 5 illustrates an example flowchart of an efficient quantum adaptive execution method of a quantum circuit.

FIG. 5 illustrates an example flowchart of an efficient quantum adaptive execution method of a quantum circuit. A quantum program is called a job and is composed of a list of quantum circuits. A quantum circuit is an ordered list of quantum gates that runs in a quantum computer (backend). The quantum circuit in a job can have dependencies and the result of previous quantum circuits are utilized to run a next quantum circuit. Thus, these embodiments optimize an iterative algorithm for several quantum computers with different features and noise quality. In the state of the art, users typically run one quantum program in one quantum computer. Embodiments disclosed herein facilitate use of quantum computer backends that are available to distribute a quantum program (split in circuits) in many possible backends. This eliminates constraints associated with a single quantum program running in a single quantum computer. The process begins with a receiving component as denoted by block 502 that receives a quantum program for performing a quantum task, wherein the quantum program includes a first program and a second program. The adaptive compiling component as denoted by block 504 compiles the first program. The executing component as denoted by block 506 executes the compiled first program. These methods employ one or more circuit outputs that are applied to one or more circuit inputs. The first program is defined based on the previously generated one or more outputs from the first program. The second program is defined based on the previously received one or more outputs from the second program. The receiving component recompiles the compiled first program into a first recompiled program adapted to execute on a first quantum hardware device. Upon this step, recompiling the compiled first program into a second recompiled program is adapted to execute on a second quantum hardware device. The second receiving component as denoted by block 508 receives an output based on executing the compiled first program. The second adaptive compiling component as denoted by block 510 compiles the second program based on the received output from executing the first program. A second executing component as denoted by block 512 executes the compiled second program. Receiving a second output is based on executing the recompiled second program and compiling the second program is based on selecting either the received first or the received second output. Through this way, these embodiments take advantage of many quantum computers to adapt a quantum program, speed up the execution time by splitting the program to run in different backends and thus produce a quantum circuit in the backend. An advantage of such a method can be to optimize execution time and remove back and forth of data (e.g., jobs and circuits) between user/services and the quantum backend. Accordingly, average execution time per job or circuit with dependencies is reduced.

To solve optimization problems on quantum computers, various algorithms such as VQE or QAOA can be used. The VQE algorithm is a quantum/classical hybrid algorithm that can be used to determine eigenvalues of a large matrix. An eigenvalue is a set of values of a parameter for which a differential equation has a nonzero solution (an eigenfunction) under given conditions. This algorithm has been introduced as a hybrid quantum-classical algorithm for simulating quantum systems. Some examples of quantum simulation using VQE include solving the molecular electronic Schrödinger equation and model systems in condensed matter physics.

Figure 6:
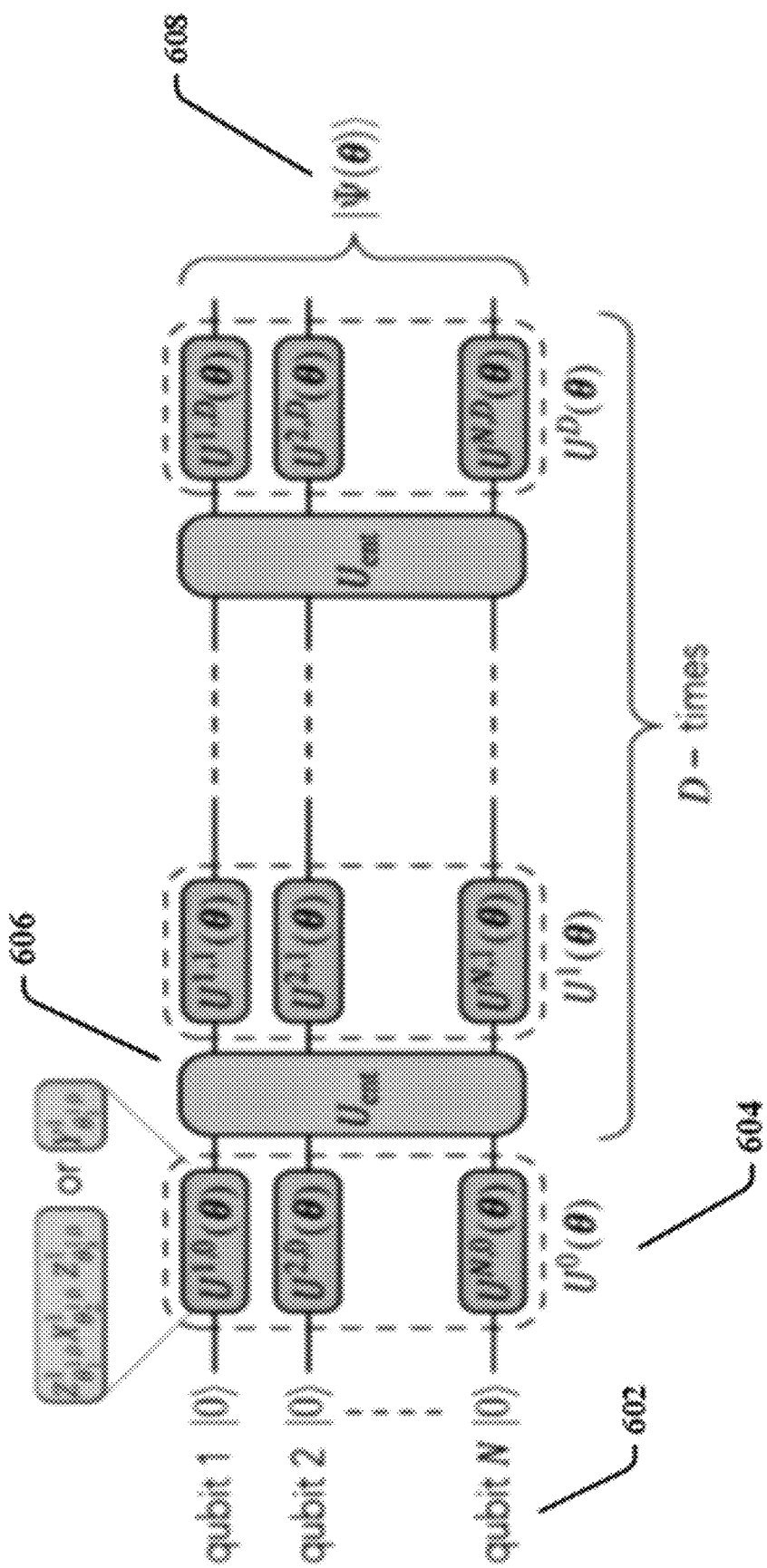
FIG. 6 illustrates an example quantum circuit for a Variational-Quantum Eigensolver (VQE) algorithm.

FIG. 6 illustrates an example quantum circuit for a Variational-Quantum Eigensolver (VQE) algorithm. The preparation of the heuristic trail states comprises of two types of quantum gates, single-qubit gate U($\theta$) denoted by 604 determined by the rotation angles $\theta$ and an entangling drift operation $U_{ent}$ denoted by 606 acting on pairs of qubits. The blocks in 606 are entangled to different N qubits as denoted by block 602 such that search can reach larger space. This algorithm is repeated D-times and the longer this process runs, the more parameters the system learns to optimize. At the end of the process, the qubits are measured and returns either a 0 or 1. Individual measurement provides a potential answer to the optimization problem. Once this algorithm runs D times with a fixed parameter such as theta in 608, then optimization can be run to obtain an optimal result. Through this technique, the algorithm runs a binary optimization problem into a continuous optimization problem. The QAOA algorithm is another hybrid quantum-classical variational algorithm designed to tackle combinatorial optimization problems. This algorithm depends on a positive integer p and the approximation quality is improved as p is increased. The quantum circuit that implements this algorithm has unitary gates and the depth of the circuit grows linearly with p times the number of constraints. If p is a fixed value, independent of the input size, then the algorithm uses an efficient method called classical preprocessing. If p grows with input size, a different strategy is proposed. These embodiments are not limited to VQE or QAOA algorithms, and any suitable algorithm can be used for quantum optimization depending on a given problem.

In a VQE algorithm, the output of one quantum circuit can be part of the input of another quantum circuit. In general, the VQE algorithm can run on the same backend and obtain a result. However, if the VQE algorithm is split and the quantum circuits are executed in different backends, then an optimal result can be obtained. The VQE algorithm can run in different backends with various configurations (different error gates) by using any type of a gate or a backend. This will affect the performance of the final result because, a quantum circuit can use various quantum gates and the error gates can be varied based on the available backend. A compiled quantum circuit provided by the user can be used (the user input) with the backend properties, qubits (T1, T2, readout error, frequency, etc.), and other general properties (fridge temperature, default parameter for pulses, etc.) which are defined in prior art. The VQE algorithm example stated above can be used to compile a circuit with an original quantum circuit written by a user along with its backend properties. The configuration of the backend can run a circuit along with the result of the previous circuits. Instead of running many of the VQE algorithms (quantum program) in the same backend, it can be split into quantum circuits which can be used as a backend (checking the original quantum program). The properties and configuration of a backend and the previous result of one quantum circuit is dependent on the next compilation. With that, the system can choose the backend execution for a quantum circuit and parallelize at the same time the quantum program to speed up the total execution time.

Figure 7:
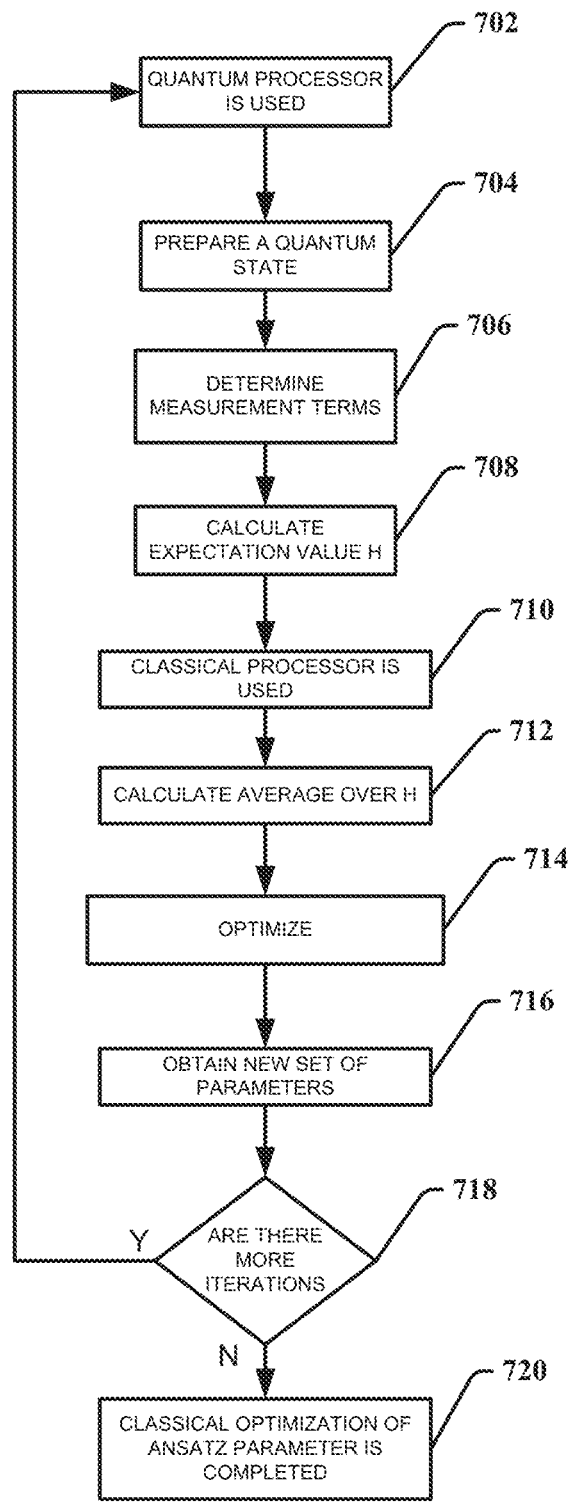
FIG. 7 illustrates an example flowchart of VQE quantum classical algorithm.

FIG. 7 illustrates an example flowchart of VQE quantum classical algorithm. As mentioned in the above paragraph, the VQE algorithm is a quantum/classical hybrid algorithm that can be used to find eigenvalues of a large matrix H. VEQ allows to find an upper bound of the lowest eigenvalue of a given Hamiltonian. VQE is a hybrid, quantum-classical algorithm and hence it performs all the computations on a quantum computer as well as a classical computer. The calculation begins by calculating the expectation value or the energy levels for a given set of parameters in the Quantum Processing Unit as denoted by 702. Given a set of parameters, a quantum state is prepared as denoted by block 704. Based on the measurement terms as denoted by block 706, the expectation value of H is calculated as denoted by 708. Upon obtaining this value in the quantum processor, the other optimization is performed in the classical processor as denoted by block 710. An average is calculated over the expectation values as denoted by block 712 to find the most accurate result. Optimization procedure as denoted by block 714 is performed to find new set of parameters as denoted by block 716. If there are more iterations as denoted by block 718, then the process repeats from block 702. If there are no more iterations to be performed, then the classical optimization of ansatz parameter is produced as denoted by block 720. An ansatz is the one that allows to cover many states and has a smaller number of parameters such that it is easier to control and optimize. This methodology has a big advantage over iterative quantum phase estimation and quantum phase estimation algorithm.

Figure 8:
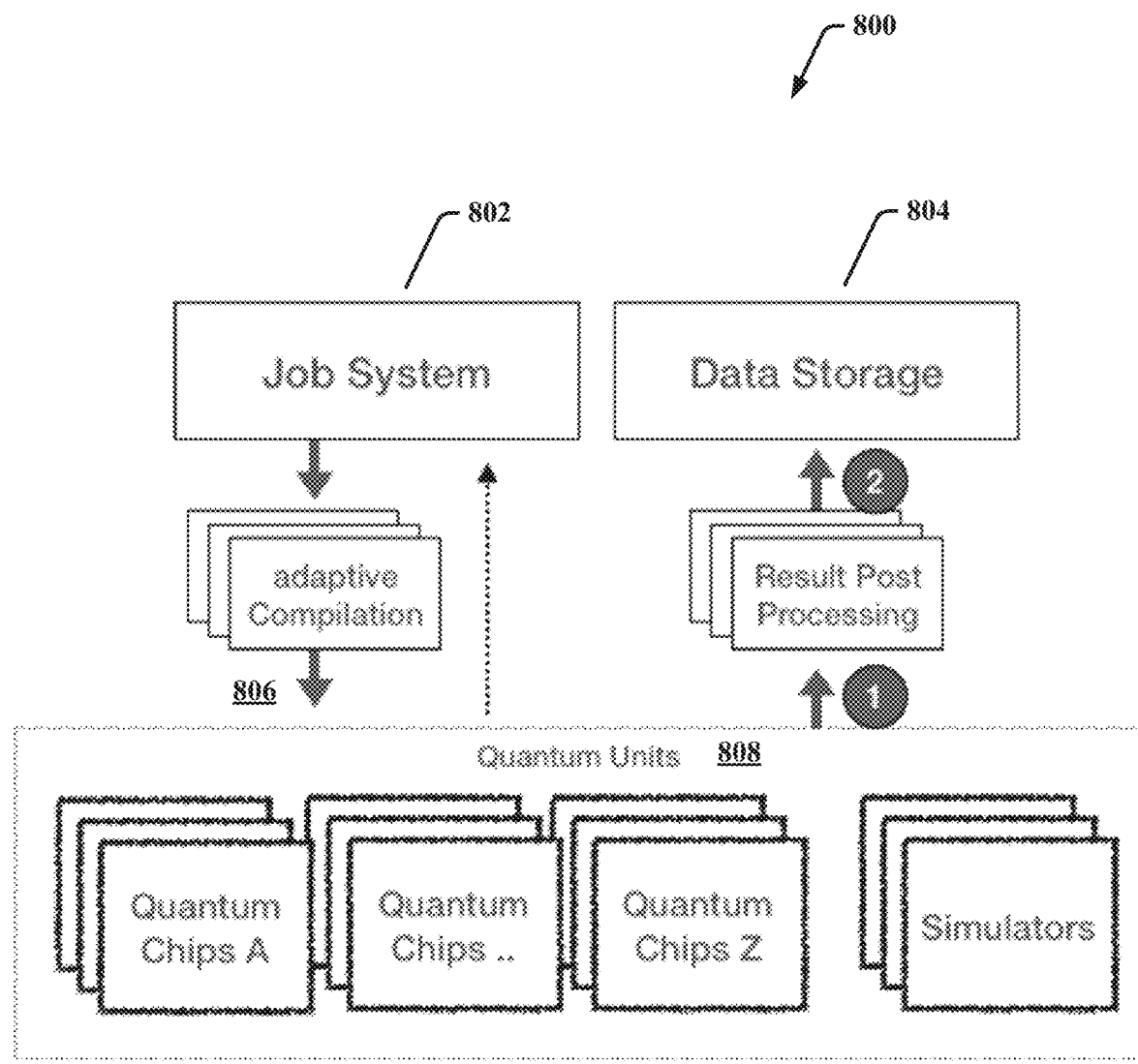
FIG. 8 illustrates a diagram of an example, non-limiting, system that can facilitate adaptive compilation of quantum computing jobs in accordance with one or more embodiments described herein.

FIG. 8 illustrates a diagram of an example, non-limiting system 800 that can facilitate adaptive compilation of quantum computing jobs in accordance with one or more embodiments described herein. Repetitive description of like elements and/or processes employed in various embodiments described herein is omitted for sake of brevity. According to multiple embodiments, system can comprise an example, non-limiting alternative embodiment of system in FIG. 8. In some embodiments, this system 800 can comprise interface component Job System 802 that can receive a quantum program from an entity (e.g., a programmer, a device, a computer, a robot, a machine, an artificial intelligence driven module, a human, etc.). In some embodiments, interface component 802 can send such quantum program to adaptive compilation component 806 to generate a modified quantum program compilation as described above with reference to FIG. 1. In some embodiments, a quantum device can be selected from quantum units(s) as denoted by block 808 based on the one or more run criteria described above with reference to FIG. 1. In some embodiments, adaptive compilation component 806 can dispatch a modified quantum program compilation to a queue of quantum units 808 selected to execute the modified quantum program compilation based on a run order position of the modified quantum program compilation in such a queue, where such a run order position can be determined. In some embodiments, the quantum device selected by selection component can execute the modified quantum program compilation generated by adaptive compilation component 806 and interface component 802 can manage results of such execution. For example, interface component 802 can return results to an entity that submitted the quantum program to interface component 802 and/or store such results in a memory device such as, for instance, memory 804 through result post processing. The post processing unit can analyze the results obtained from the previous circuit and store the data to use it against the next compilation along with the second program parameters. The result post processing unit is the one in charge to apply this logic and manage the input/output of data to push in the compiler units and the job dispatcher.

In some embodiments, quantum adaptive execution system can be associated with various technologies. For example, quantum adaptive compilation system can be associated with classical compiler technologies, quantum-based compiler technologies, classical computer workload scheduling technologies, quantum computer workload scheduling technologies, quantum mechanics technologies, quantum computation technologies, quantum computer technologies, quantum hardware and/or software technologies, quantum simulator technologies, classical domain and/or quantum domain data processing technologies, machine learning technologies, artificial intelligence technologies, and/or other technologies.

In some embodiments, quantum adaptive execution system can provide technical improvements to systems, devices, components, operational steps, and/or processing steps associated with the various technologies identified above. For example, quantum adaptive compilation system can analyze one or more quantum devices (e.g., can analyze one or more attributes of a quantum device such as, for instance, configuration, properties, availability, etc.), as well as one or more quantum programs (e.g., the next quantum program(s)) waiting to run in such quantum devices(s) and can further modify one or more elements (e.g., quantum circuit(s), pulse schedule(s), etc.) of a certain quantum program to enable execution of such a quantum program on a certain quantum device at a particular moment (e.g., the next available quantum device, the quantum device having the highest level of fidelity relative to other quantum device, etc.). In this example, quantum adaptive compilation system can: a) receive (e.g., via interface component 802) a quantum program; b) analyze the circuits to run and the backends (e.g., quantum devices) available; and/or c) generate a modified quantum program compilation (e.g., by modifying of one or more elements of the received quantum program) that can be ready to execute in the next iteration of an available backend. In this example, therefore, quantum adaptive compilation system can facilitate reduced execution time of a certain quantum program submitted to quantum adaptive compilation system and/or enable a balancing of the workloads of the quantum devices (e.g., reducing latency of the quantum devices) to stabilize the use of each one in function of the quantum programs submitted to quantum adaptive compilation system.

In some embodiments, quantum adaptive execution system can provide technical improvements to a processing unit (e.g., processor) associated with a classical computing device and/or a quantum computing device (e.g., a quantum processor, quantum hardware, superconducting circuit, etc.). For example, by performing compilation of (e.g., programming language translation) and/or modification of one or more elements of a received quantum program (e.g., quantum circuit(s), pulse schedule(s), etc.) to generate a modified quantum program compilation that can be executed by a certain quantum device at a certain time, quantum adaptive compilation system can facilitate reduced execution time of a certain quantum program submitted to quantum adaptive compilation system and/or reduced latency of the quantum device, thereby improving efficiency and/or performance of a processing unit (e.g., processor) associated with such a quantum device.

In some embodiments, quantum adaptive execution system can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above. In some embodiments, quantum adaptive compilation system and/or components thereof, can be employed to solve new problems that arise through advancements in technologies mentioned above, employment of quantum computing systems, cloud computing systems, computer architecture, and/or another technology.

It is to be appreciated that quantum adaptive compilation system can utilize various combinations of electrical components, mechanical components, and circuitry that cannot be replicated in the mind of a human or performed by a human, as the various operations that can be executed by quantum adaptive compilation system and/or components thereof as described herein are operations that are greater than the capability of a human mind. For instance, the amount of data processed, the speed of processing such data, or the types of data processed by quantum adaptive compilation system over a certain period of time can be greater, faster, or different than the amount, speed, or data type that can be processed by a human mind over the same period of time.

According to several embodiments, quantum adaptive compilation system can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that quantum adaptive compilation system can include information that is impossible to obtain manually by an entity, such as a human user. For example, the type, amount, and/or variety of information included in quantum adaptive compilation system, receiving component 108, adaptive compilation component 110, executing component 112, second receiving component 214, second adaptive compiling component 216, second executing component 218 and/or quantum device(s) can be more complex than information obtained manually by a human user.

Figure 9:
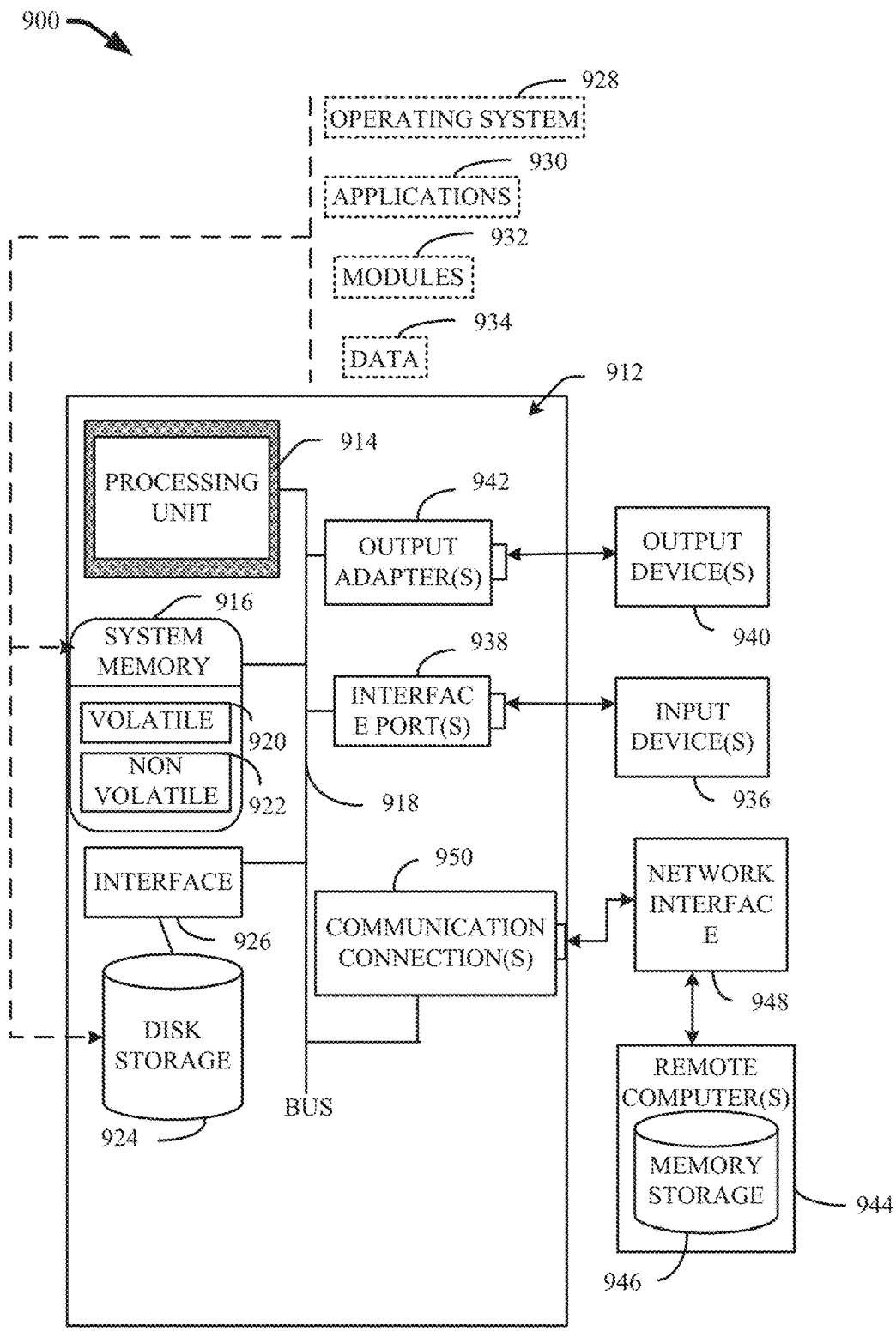
FIG. 9 illustrates a block diagram of an example, non-limiting, operating environment in which one or more embodiments described herein can be facilitated.

In order to provide a context for the various aspects of the disclosed subject matter, FIG. 9 as well as the following discussion are intended to provide a general description of a suitable environment in which the various aspects of the disclosed subject matter can be implemented. FIG. 9 illustrates a block diagram of an example, non-limiting operating environment in which one or more embodiments described herein can be facilitated. Repetitive description of like elements employed in other embodiments described herein is omitted for sake of brevity.

With reference to FIG. 9, a suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 916 can also include volatile memory 920 and non-volatile memory 922. The basic input/output system (BIOS), containing the basic routines to transfer information between elements within the computer 912, such as during start-up, is stored in non-volatile memory 922. Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media. To facilitate connection of the disk storage 924 to the system bus 918, a removable or non-removable interface is typically used, such as interface 926. FIG. 9 also depicts software that acts as an intermediary between users and the basic computer resources described in the suitable operating environment 900. Such software can also include, for example, an operating system 928. Operating system 928, which can be stored on disk storage 924, acts to control and allocate resources of the computer 912.

System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor-based appliance, a peer device or other common network node and the like, and typically can also include many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

Figure 10:
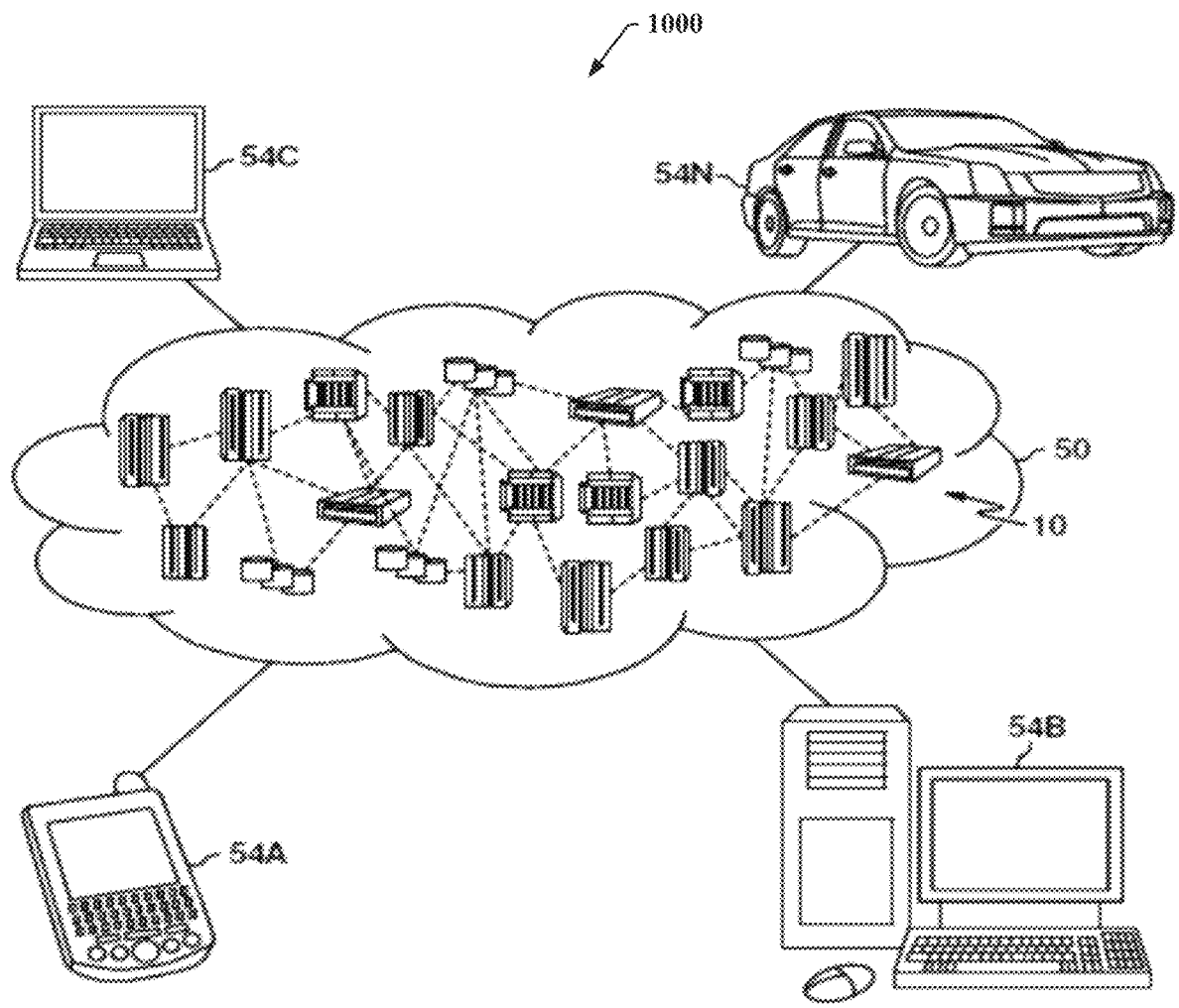
FIG. 10 illustrates a block diagram of an example, non-limiting, cloud computing environment in accordance with one or more embodiments of the subject disclosure.

Referring now to FIG. 10, an illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Although not illustrated in FIG. 10, cloud computing nodes 1010 can further comprise a quantum platform (e.g., quantum computer, quantum hardware, quantum software, etc.) with which local computing devices used by cloud consumers can communicate. Nodes 1010 may communicate with one another. They may be grouped (not shown) physically or virtually, in one or more networks, such as Local, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
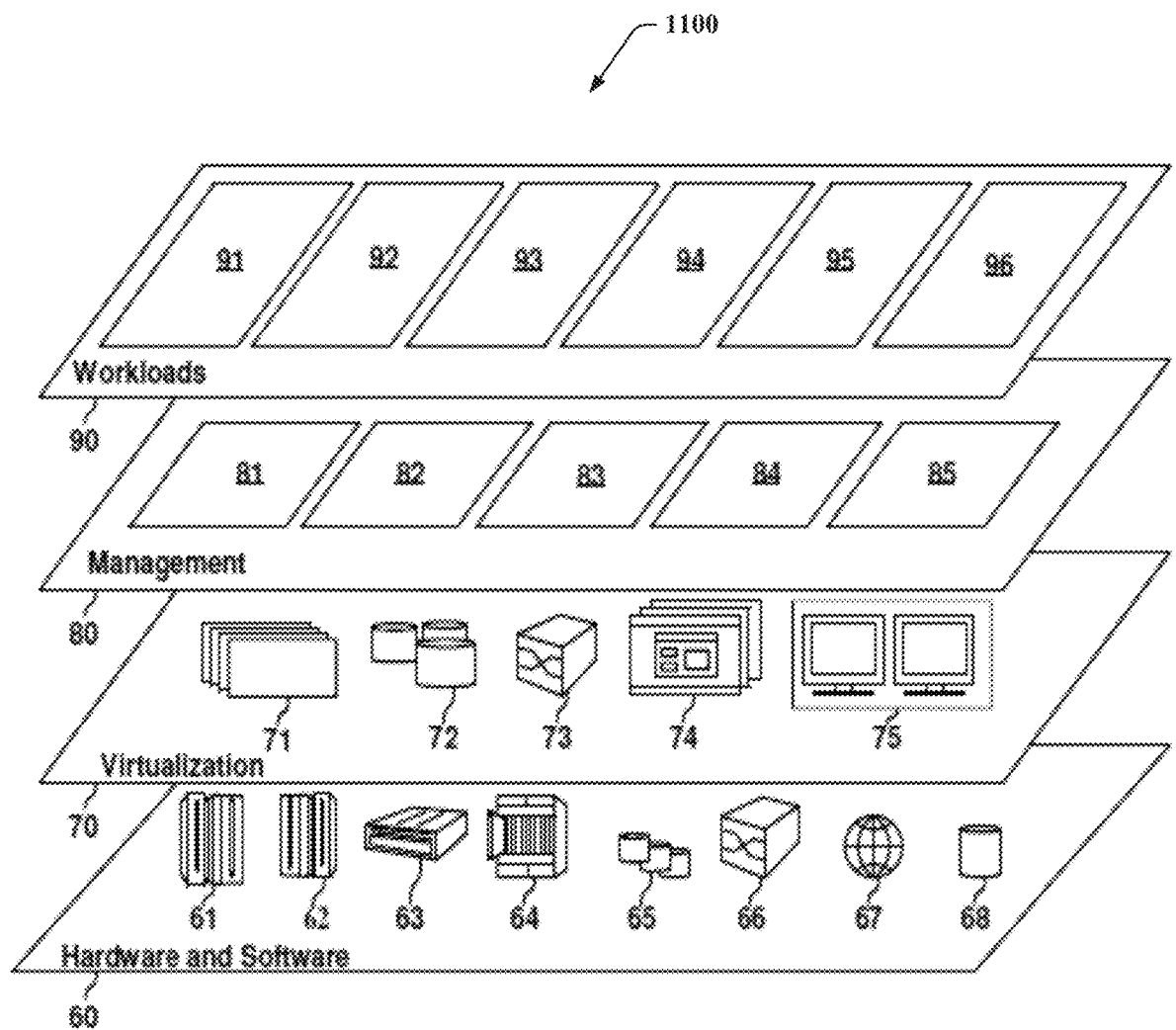
FIG. 11 illustrates a block diagram of example, non-limiting, abstraction model layers in accordance with one or more embodiments of the subject disclosure.

Referring now to FIG. 11, a set of functional abstraction layers provided by cloud computing environment 1150 (FIG. 11) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 include hardware and software components. Examples of hardware components include: mainframes 1161; RISC (Reduced Instruction Set Computer) architecture-based servers 1162; servers 1163; blade servers 1164; storage devices 1165; and networks and networking components 1166. In some embodiments, software components include network application server software 1167, quantum platform routing software 1168, and/or quantum software (not illustrated in FIG. 11).

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Non-limiting examples of workloads and functions which may be provided from this layer include: mapping and navigation 1191; software development and lifecycle management 1192; virtual classroom education delivery 1193; data analytics processing 1194; transaction processing 1195; and quantum state preparation software 1196.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It can also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or non-volatile memory, or can include both volatile and non-volatile memory. By way of illustration, and not limitation, non-volatile memory can include read only memory (ROM), programmable ROM (PROM), electrically programmable ROM (EPROM), electrically erasable ROM (EEPROM), flash memory, or non-volatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the following computer executable components stored in the memory, wherein the computer executable components comprise:
a receiving component that receives a quantum program for performing a quantum task, wherein the quantum program includes a first program and a second program;
an adaptive compiling component that compiles the first program;
an executing component that executes the compiled first program;
a second receiving component that receives an output based on executing the compiled first program;
a second adaptive compiling component that compiles the second program based on the received output from executing the first program;
a second executing component that performs an adaptive execution of the compiled second program; and
the first and the second adaptive quantum compilations are optimized for two different specific backends with different features and noise quality and are redirected to the respective backends for execution.

2. The system of claim 1, further comprising a determining component that employs one or more circuit outputs applied to one or more circuit inputs.

3. The system of claim 1, wherein the first program is defined based on a previously generated one or more outputs from the first program.

4. The system of claim 1, wherein the second program is defined based on a previously received one or more outputs from the second program.

5. The system of claim 1, wherein the receiving component recompiles the compiled first program into a first recompiled program adapted to execute on a first quantum hardware device.

6. The system of claim 5, wherein receiving the output is based on executing the recompiled first program.

7. The system of claim 1, wherein recompiling the compiled first program into a second recompiled program is adapted to execute on a second quantum hardware device.

8. The system of claim 7, wherein receiving a second output is based on executing the recompiled second program.

9. The system of claim 1, wherein compiling the second program is based on selecting either the output or a second output.

10. A computer-implemented method, comprising:
receiving, by a system operatively coupled to a quantum program for performing a quantum task, wherein the quantum program includes a first program and a second program;
compiling, by the system, the first program;
executing, by the system, the compiled first program;
receiving, by the system, an output based on executing the compiled first program; compiling, by the system, the second program based on the received output from executing the first program;
performing an adaptive execution, by the system, the compiled second program; and
optimizing, the first and the second adaptive quantum compilations for two different specific backends with different features and noise quality and redirecting to the respective backends for execution.

11. The computer implemented method of claim 10, further comprising:
determining, by the system, one or more circuit outputs that are applied to one or more circuit inputs.

12. The computer implemented method of claim 10, further comprising:
employing, by the system, the first program which is defined based on a previously generated one or more outputs from the first program.

13. The computer implemented method of claim 10, further comprising:
employing, by the system, the second program which is defined based on a previously received one or more outputs from the second program.

14. The computer implemented method of claim 10, further comprising:
recompiling, by the system, the compiled first program into a first recompiled program adapted to execute on a first quantum hardware device.

15. The computer implemented method of claim 14, further comprising:
receiving, by the system, the output based on executing the recompiled first program.

16. The computer implemented method of claim 10, further comprising:
recompiling, by the system, the compiled first program into a second recompiled program adapted to execute on a second quantum hardware device.

17. The computer implemented method of claim 16, further comprising:
receiving, by the system, a second output based on executing the recompiled second program.

18. The computer implemented method of claim 10, further comprising:
compiling, by the system, the second program based on selecting either the output or a second output.

19. A computer program product facilitating a quantum adaptive execution of quantum circuits, the computer program product comprising a computer readable storage medium having program instructions embodied therewith, the program instructions executable by a processor to cause the processor to:
receive, by the processor, a quantum program for performing a quantum task, wherein the quantum program includes a first program and a second program;
compile, by the processor, the first program;
execute, by the processor, the compiled first program;
receive, by the processor, an output based on executing the compiled first program;
compile, by the processor, the second program based on the received output from executing the first program;
perform an adaptive execution, by the processor, the compiled second program; and
optimize, the first and second adaptive quantum compilations for two different specific backends with different features and noise duality and redirect to the respective backends for execution.

20. The computer program product of claim 19, wherein the program instructions are further executable by the processor to cause the processor to:
determine, by the processor, one or more circuit outputs that are applied to one or more circuit inputs.

21. The computer program product of claim 19, wherein the program instructions are further executable by the processor to cause the processor to:
employ, by the processor, the first program which is defined based on a previously generated one or more outputs from the first program.

22. The computer program product of claim 19, wherein the program instructions are further executable by the processor to cause the processor to:
employ, by the processor, the second program which is defined based on a previously received one or more outputs from the second program.

23. The computer program product of claim 19, wherein the program instructions are further executable by the processor to cause the processor to:
recompile, by the processor, the compiled first program into a first recompiled program adapted to execute on a first quantum hardware device.

24. The computer program product of claim 23, wherein the program instructions are further executable by the processor to cause the processor to:
receive, by the processor, the output based on executing the recompiled first program.

25. The computer program product of claim 19, wherein the program instructions are further executable by the processor to cause the processor to:
recompile, by the processor, the compiled first program into a second recompiled program adapted to execute on a second quantum hardware device.

* * * * *